United States Patent [19]

Wrona

[11] 4,198,846

[45] Apr. 22, 1980

[54] STAMPING PRESS

[76] Inventor: Theodore J. Wrona, 812 Canterbury Rd., Sturgis, Mich. 49091

[21] Appl. No.: 879,138

[22] Filed: Feb. 21, 1978

[51] Int. Cl.$^2$ .......................... B21J 9/18; F16H 23/00

[52] U.S. Cl. .......................................... 72/450; 74/60; 74/25; 100/280

[58] Field of Search ............... 74/570, 571 R, 25, 595, 74/60; 100/280; 72/429, 450

[56] References Cited

U.S. PATENT DOCUMENTS

| | | | |
|---|---|---|---|
| 2,968,961 | 1/1961 | McGregor | 74/571 |
| 3,665,873 | 5/1972 | Wittler | 74/60 |
| 3,808,912 | 5/1974 | Voorhees et al. | 74/604 |

*Primary Examiner*—Kenneth Dorner
*Attorney, Agent, or Firm*—Marmaduke A. Hobbs

[57] ABSTRACT

A stamping press in which a frame supports a ram for reciprocating movement thereof and one or more wobble plates mounted on a main shaft operate a pivoted yoke for reciprocating the ram, and a die section mounted thereon. The ram is normally operated through two complete reciprocating movements for each revolution of the main shaft, and a counter-weight operated by the yoke is preferably included in the press structure for balancing the movement of the ram. The wobble plates may have a means for adjusting the angularity to vary the length of the ram stroke, and the crown of the press is preferably hydraulically separated with respect to the base to provide a safety overload feature and easy access to the work pieces or tooling. In a modification, cams operated by the yoke may be used to drive the ram from the yoke as it is operated by the wobble plate to provide one complete reciprocating movement for each revolution of the main shaft.

18 Claims, 20 Drawing Figures

Fig. 5
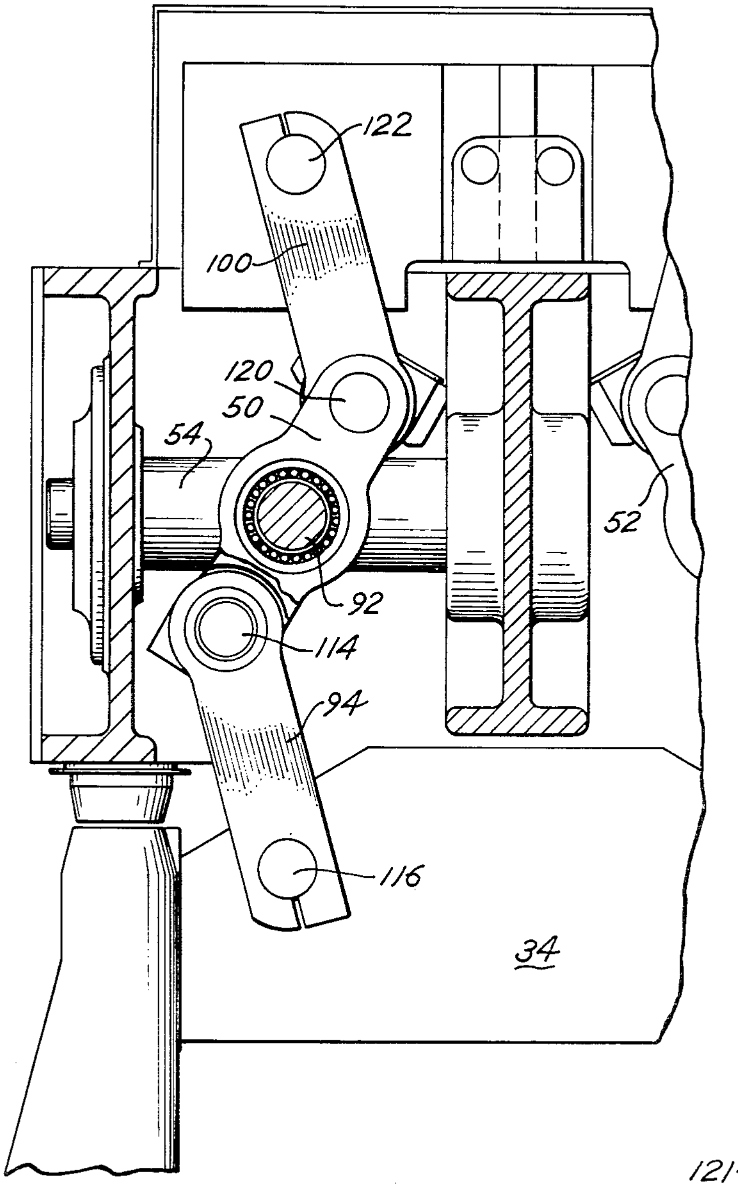
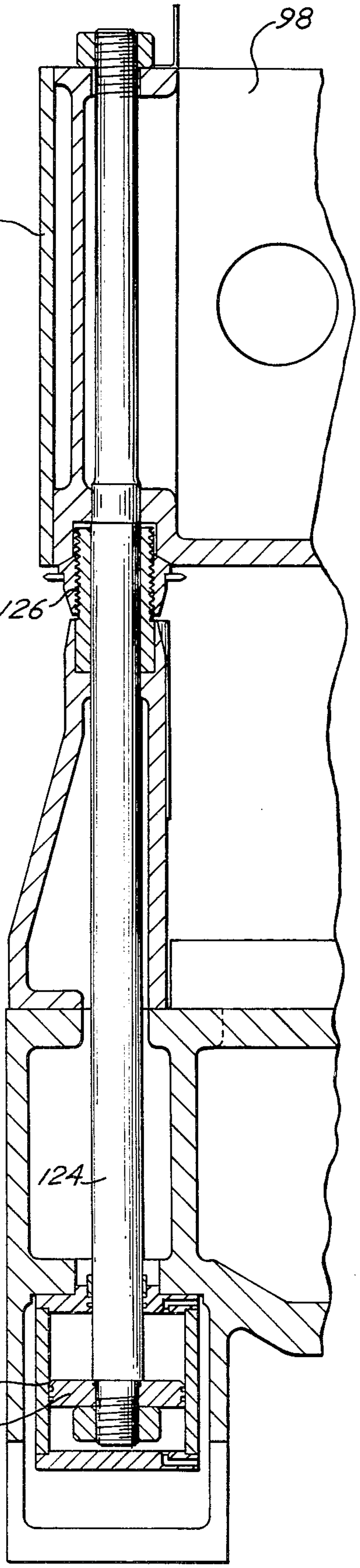
Fig. 6

Fig. 14
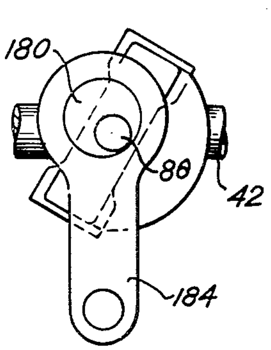
Fig. 15
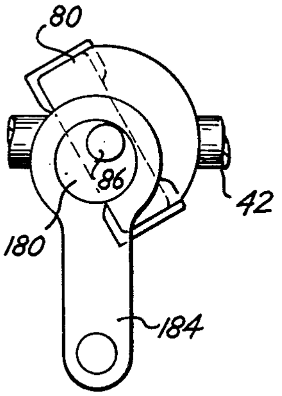
Fig. 17
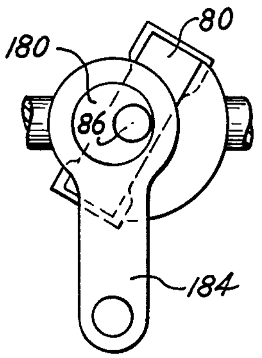
Fig. 18
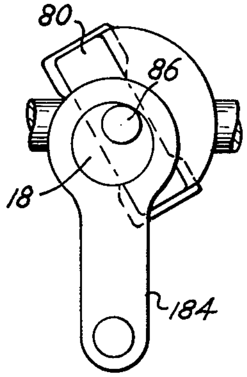
Fig. 19
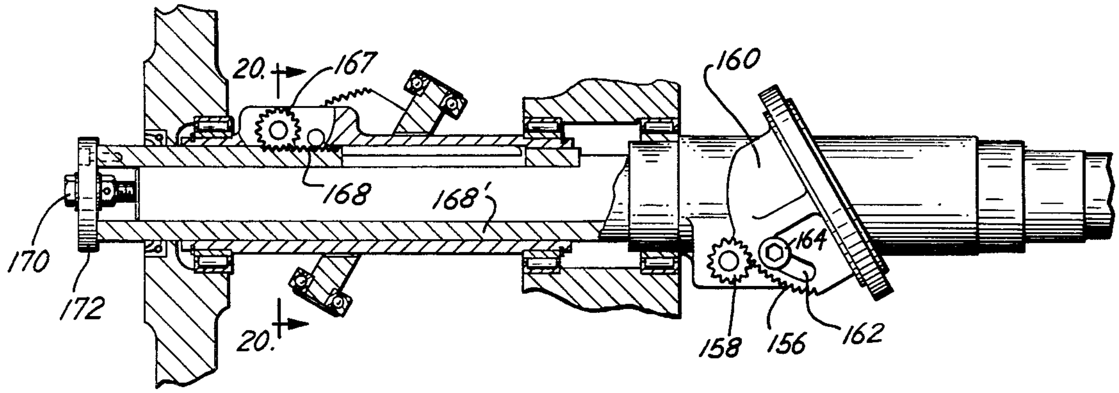
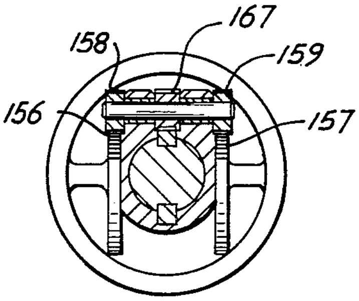
Fig. 20

STAMPING PRESS

In conventional stamping presses, the ram and bolster or pressure plate are operated by one or more cams mounted on a rotating drive shaft which drives the cam one revolution for each revolution of the shaft. Most such presses have a relatively large flywheel mounted on and driven with the drive shaft by an electrical motor or other suitable source of power. The presses are often driven at a relatively high rate of speed in order to obtain maximum output; however, this creates operational problems within the press, particularly with respect to the inertia and centrifugal forces of the plunger and flywheel and related components, these forces thus limiting either the capacity or speed of the press and hence precluding maximum efficiency. These problems are particularly difficult unless all the moving parts are balanced and counter-balanced, in that excessive wear is created which may cause frequent servicing and replacement of parts and occasional breakdowns. It is therefore one of the principal objects of the present invention to provide a stamping press which is so constructed and designed that two press strokes are completed for every revolution of the main drive at substantially increased speed over the conventional press, and larger flywheels can be used effectively and efficiently.

Another object of the invention is to provide an automatic stamping press in which all moving members in the drive system are balanced, with opposing members requiring equal force, and which can be readily adapted to a variety of different types of operation with different length strokes without making substantial modifications in the press drive system.

Still another object of the invention is to provide a stamping press which is so constructed and designed that the drive shaft transmits torque and transforms the torque into the force necessary for performing the stamping operation, and in which the heat produced from the rotation of the drive shaft does not affect the accuracy of the work since the heat is not transmitted to all the force transmitting members.

A further object is to provide a press of the aforesaid type which is efficient and versatile in operation for performing a variety of different types of stamping operations, and which can be constructed and designed to permit easy adjustment to vary the press stroke without changing the shut height.

Additional objects and advantages of the present invention will become apparent from the following description and accompanying drawings, wherein:

FIG. 5 is a fragmentary vertical cross sectional view of the stamping press, the section being taken on line 5—5 of FIG. 3;

FIG. 6 is a fragmentary vertical cross sectional view of the press, the section being taken on line 6—6 of FIG. 2;

FIGS. 13, 14 and 15 are side elevational views of a further modified form of the drive mechanism;

FIGS. 16, 17 and 18 are still further modifications of the drive mechanism involving the present invention;

FIG. 19 is a partial elevational and cross sectional view of a modified form of the main drive shaft and force transmitting structure embodying the present invention; and FIG. 20 is a vertical cross sectional view of the drive shaft shown in FIG. 19, the section being taken on line 20—20 of the latter figure.

Figure 1:
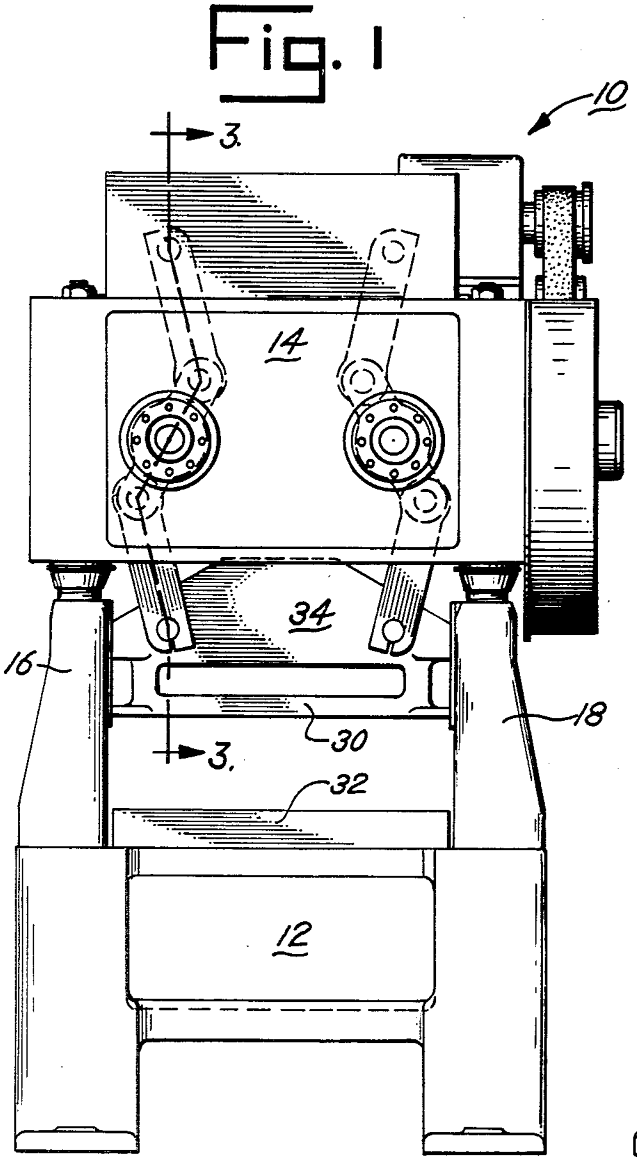
FIG. 1 is a front elevational view of a stamping press embodying the present invention.
Figure 2:
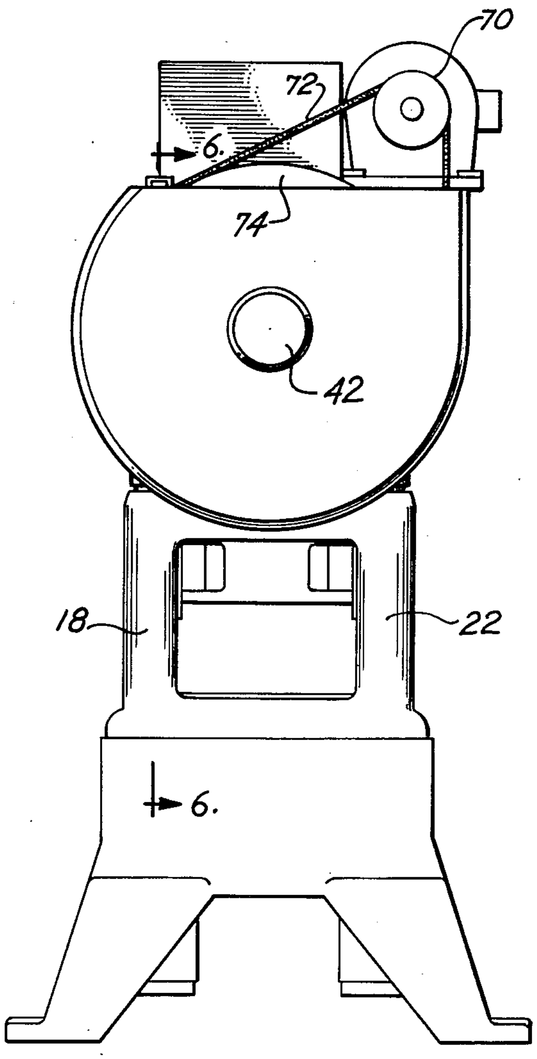
FIG. 2 is a side elevational view of the stamping press shown in FIG. 1.
Figure 3:
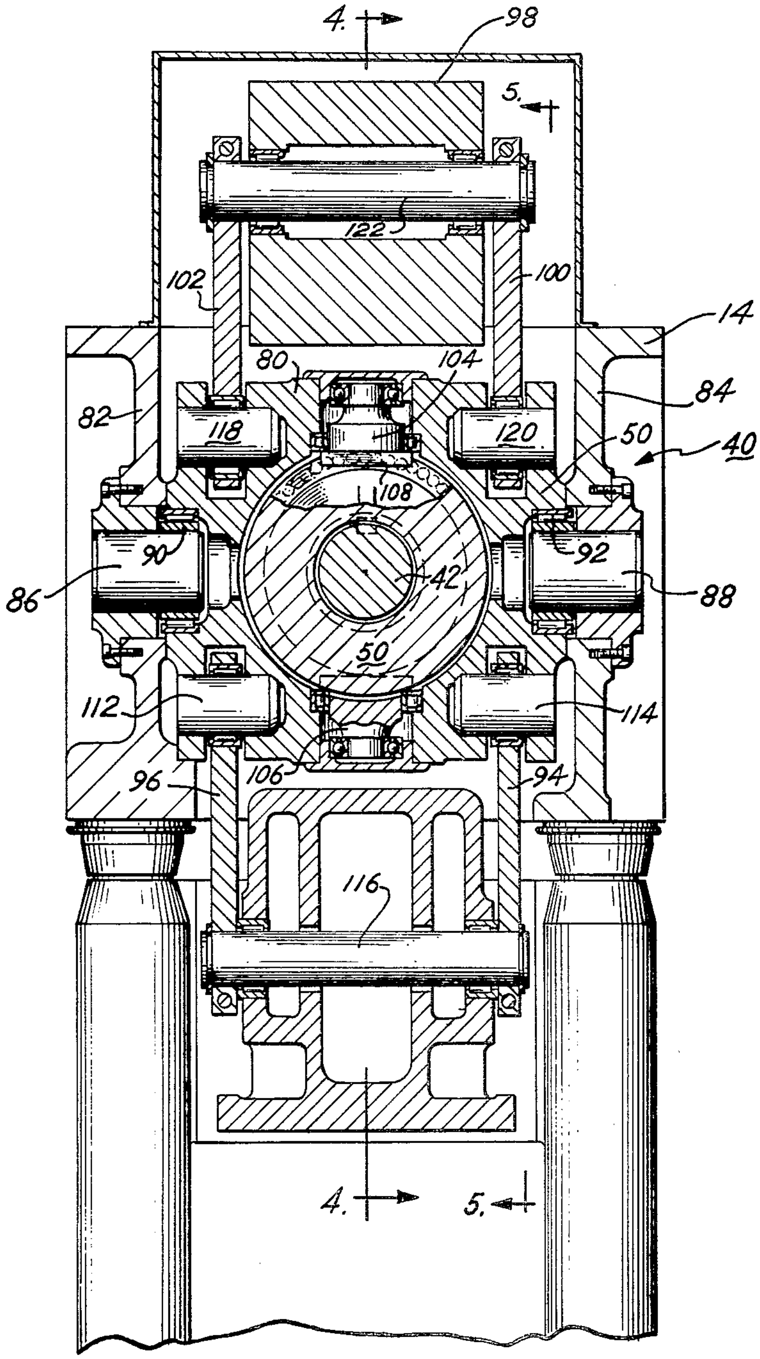
FIG. 3 is a vertical cross sectional view of the press shown in FIGS. 1 and 2, the section being taken on line 3—3 of FIG. 1.

Referring more specifically to the drawings, numeral 10 indicates generally a stamping press embodying the present invention and consisting of a base 12, crown 14 and posts 16, 18, 20 and 22 tying the base and the crown together. The four posts are hydraulically releasable to assist in positioning the upper and lower bolsters for operating on a work piece, as will be more fully described hereinafter. An upper bolster 30 and lower bolster 32 are complementary parts for supporting upper and lower die sections, respectively, for performing the stamping operation. The lower bolster or pressure plate 32 is normally supported rigidly by base 12 and the upper bolster or pressure plate 30 is supported by ram 34 for reciprocating movement toward and away from bolster or pressure plate 32. The upper die section is secured rigidly to ram 34 and reciprocates therewith. Most of the features of the stamping press thus far described are considered, for the purpose of the present description, to be conventional parts of a well known structure, and hence further detailed description of these parts is not necessary for a full understanding of the present invention.

The main drive shaft for ram 34, and hence for the upper pressure plate and die section mounted thereon, is indicated generally by numeral 40 and consists of a main drive shaft 42 journaled in bearings mounted in crown 14. The shaft drives wobble plates 50 and 52 mounted on shaft sections 54 and 56, respectively, the shaft section 54 being journaled in bearings 57 and 58 and shaft section 56 being journaled in bearings 60 and 62, the two wobble plates preferably being mounted in opposite directions to one another for effective balancing. The two shaft sections are keyed or otherwise rigidly joined to shaft 42, and hence, in effect, form a part of the main drive shaft. The four bearings of the shaft sections are mounted in the crown and the shaft sections are keyed with drive shaft 42 for rotation therewith. The main drive shaft, including sections 54 and 56, and the wobble plates are driven by a motor 70 mounted on crown 14, and belt 72 drives flywheel 74 which is mounted on one end of shaft 42. Two flywheels, one mounted on each end of shaft 42, may be used if desired.

In the embodiments illustrated in the drawings, ram 34 is operated by wobble plates 50 and 52, and the two wobble plates are disposed in openings in yokes 80 and 82 which surround the respective plates and are pivoted in the side wall of crown 14. Since the two wobble plate assemblies, including the yokes, are the same, only one will be described in detail, and like parts of the other will be identified by the same numeral with primes. The yoke 80 is supported in the crown for rocking movement on an axis transverse to main shaft 42, by stub shafts 86 and 88 journaled in bearings 90 and 92. The yoke is pivotally connected at its lower portion to ram 34 by rods 94 and 96 and is pivotally connected at its upper portion to a counter-weight 98 by rods 100 and 102. As the yoke oscillates or rocks on its transverse axis, it raises and lowers ram 34 and lowers and raises counter-weight 98; thus the movement of the ram is balanced by the counter-weight.

Figure 4:
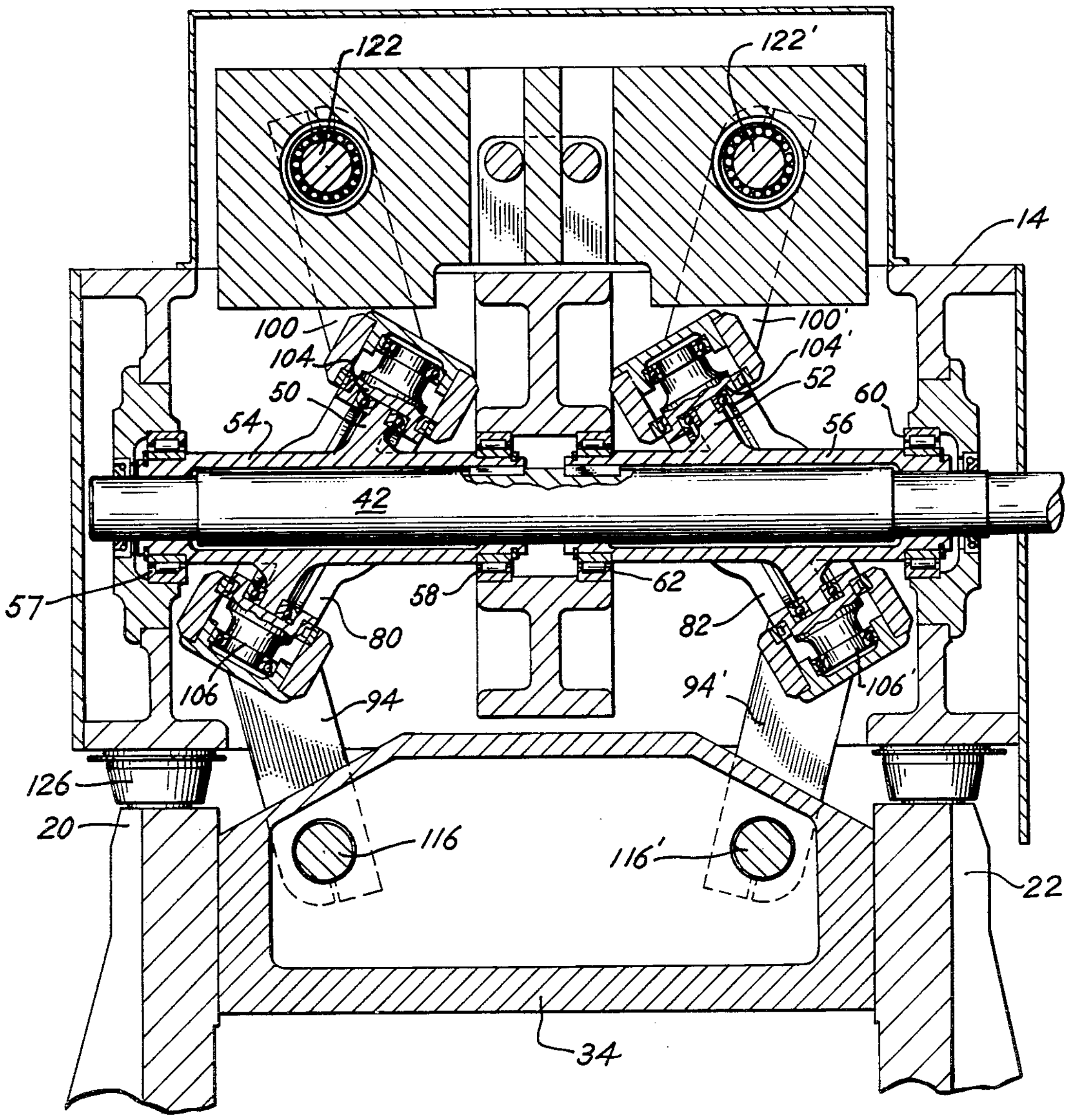
FIG. 4 is an enlarged cross sectional view of the press shown in the preceding figures, the section being taken on line 4—4 of FIG. 3.
Figure 7:
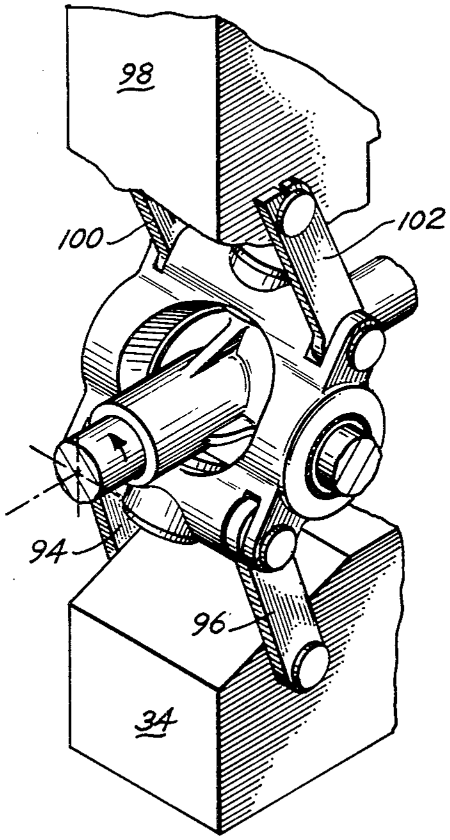
FIGS. 7, 8, 9 and 10 are perspective views of the drive system of the stamping press, shown in the preceding figures, and embodying the present invention and illustrating the various positions of the moving parts of the drive mechanism.
Figure 8:
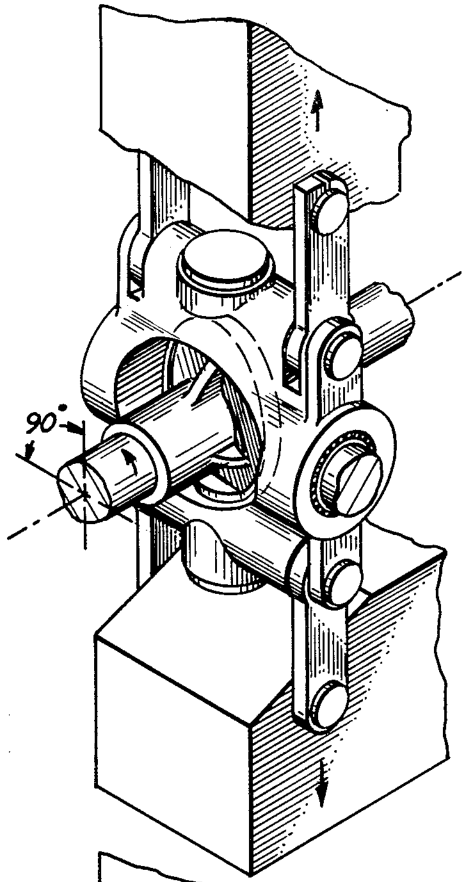
Figure 9:
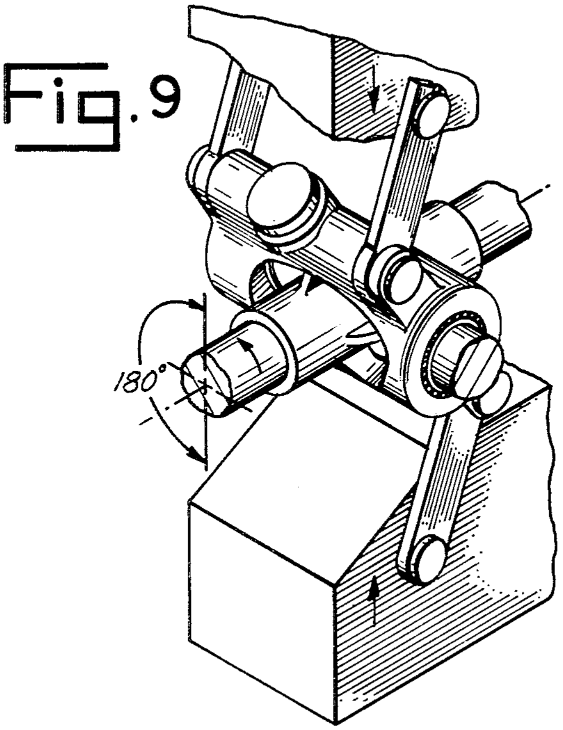
Figure 10:
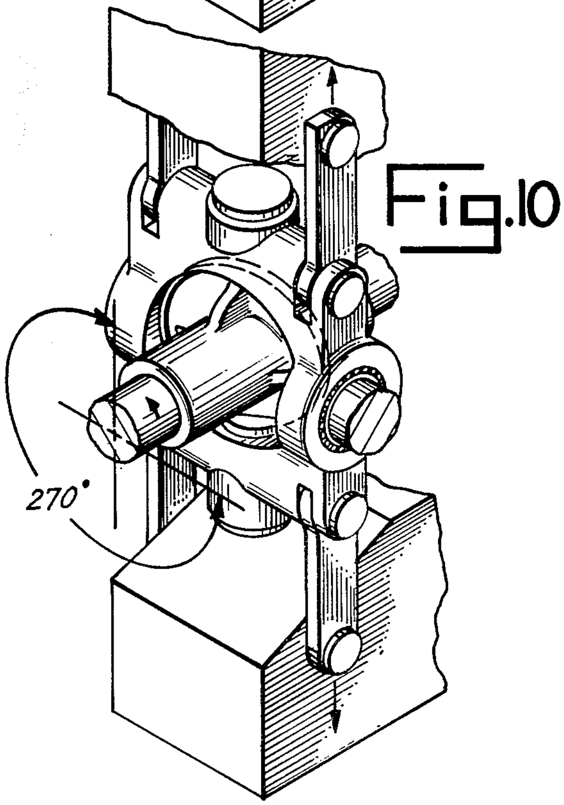

The yoke is driven through its oscillating or rocking motion by wobble plate 50 which is rigidly secured to section 54, which in turn is rigidly connected to drive shaft 42. The wobble plate is set at an angle with respect to shaft 42, as best seen in FIG. 4, so that as the shaft 42 and shaft section 54 are rotated, the wobble plate is likewise rotated with the periphery thereof moving from side to side on a plane with the axis of the drive shaft. The periphery of the wobble plate is journaled in opposed bearing assemblies 104 and 106 which are journaled in the upper and lower portions, respectively, of the yoke. Connecting rods 94 and 96 are connected to the yoke by stub shafts 112 and 114, respectively, and to a shaft 116 extending through the ram, and connecting rods 100 and 102 are connected to the yoke 80 by stub shafts 118 and 120 and are connected to the counter-weight 98 by a shaft 122. Shafts 116 and 122 are journaled in bearings in the ram and counter-weight, respectively. As the wobble plate rotates with shaft 42, the periphery passes through the straight bearing 108 on each bearing assembly. The force therefrom is transmitted to the two bearing assemblies, which in turn cause the yoke to rock on stub shafts 86 and 88. The operation of the drive assembly, including the wobble plate, is effectively illustrated in FIGS. 7 through 10, which show the wobble plate passing from one extreme angular position in FIG. 7 through a vertical position in FIG. 8 to the other extreme angular position in FIG. 9, and thence to a vertical position in FIG. 10. Hence, with each revolution of the shaft, the wobble plate causes the ram to make two complete up and down operations, thus permitting the press to be driven at a relatively low speed and yet maintain a high production rate. In the embodiment of the invention illustrated in FIGS. 1 through 10, the two wobble plates mounted on a common shaft are illustrated. Although the counter-weight is a desirable feature to balance the forces in the press, a single wobble plate may be used in conjunction with a single drive assembly, and the press can be operated without the counter-weight, although not as efficiently or as safely.

The spacing between the base and crown, and hence the clearance between the die sections is mechanically adjusted and maintained hydraulically in optimum operating position by a hydraulic cylinder 121 and piston 123, the cylinder and piston being mounted in the base, and the piston is connected to the crown by a piston rod 124. A suitable hydraulic system (not shown) operates the cylinder and piston to maintain the shut height and to provide an overload safety release. The entire press frame is held by twenty per cent more pressure than the work pressure, and the hydraulic pressure is adjusted to release the shut position if the pressure exceeds twenty per cent, thus providing the safety overload system in the press. The crown is maintained in an adjusted position by a threaded collar 126 mounted in each post at the lower edge of the crown, the four nuts being synchronized to maintain a parallel condition between the ram and bolster. Thus, a fine adjustment can be made to obtain the desired positioning of the die sections to one another.

In the operation of the stamping press shown in FIGS. 1 through 10, with upper and lower die sections mounted on the ram and base plates, the shaft 42 is driven by motor 70 through belt 72 and flywheel 74, thus causing the shaft sections 54 and 56 and the respective wobble plates to rotate. As the two wobble plates rotate, the respective yokes 80 and 82 oscillate to the right and left as seen in FIG. 4, raising ram 34 and lowering the counter-weight when the yokes are in their maximum angular positions and lowering the ram and raising the counter-weight as the yokes approach and reach center or vertical position. Since the rocking motion from one side to the other side and then back to the original side occurs for each revolution of shaft 42, the ram is operated through two complete stamping operations with each revolution of the shaft. Thus, compared with a conventional stamping press, the present press can be driven at only half speed to obtain the same output of the press, or if driven at the same speed as the conventional press, it will perform twoce as may stamping operations per unit of time. As the wobble plates rotate, the peripheral edges thereof move freely in bearing assemblies 104 and 106 to oscillate the yoke. While the wobble plate is disposed in a cylindrical opening in the yoke, the only contact between the periphery and the yoke is through the two bearing assemblies. As the yokes oscillate, the upper and lower edges pass through an arc, with the maximum upward and downward points occurring when the yokes are in vertical positions. This arcuate motion of the upper and lower portions of the yoke lifts rods 94 and 96 of yoke 80 and rods 94' and 96' of yoke 82 to lift and lower the ram. Simultaneously, the rods 100 and 102 of yoke 80 and rods 100' and 102' of yoke 82 move the counter-weight 98 upwardly and downwardly in the direction opposite to that of the ram, thus balancing the forces transmitted by drive shaft 42 so that a smooth, virtually vibration-free operation is obtained.

A further and/or alternative adjustment in the stroke of the press can be obtained in the manner illustrated in Figures 19 and 20 in which angularity of the wobble plates 80 and 82 can be adjusted, thus changing the stroke of the press. This is obtained by the use of the racks 156 and 157 and pinions 158 and 159 mounted on shaft sections 54 and 56, the two racks being mounted on a fixture 160 of each wobble plate. The fixture is guided and limited in movement by a slot 162 and stop 164. Each pinion is operated by a pinion 167 and a rack 168 which is movable endwise upon the adjustment of a screw 170 in the end plate 172. When the screw is moved in the direction which permits racks 158 and 168' to move inwardly, the angularity of the wobble plate is increased, thereby increasing the stroke of the press, and when the screw is moved in the direction to move the racks outwardly, the angularity of the wobble plate is decreased, thereby decreasing the stroke of the press. This adjustment can effectively be made after the press has been assembled and at any time thereafter in order to obtain the desired press stroke.

Figure 12:
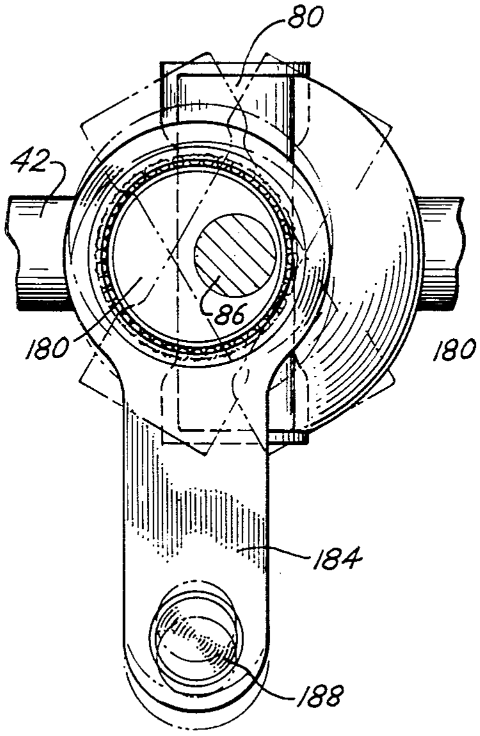
FIG. 12 is a partial cross sectional and elevational view of the mechanism shown in FIG. 11, the section being taken on line 12—12 of FIG. 11.
Figure 11:
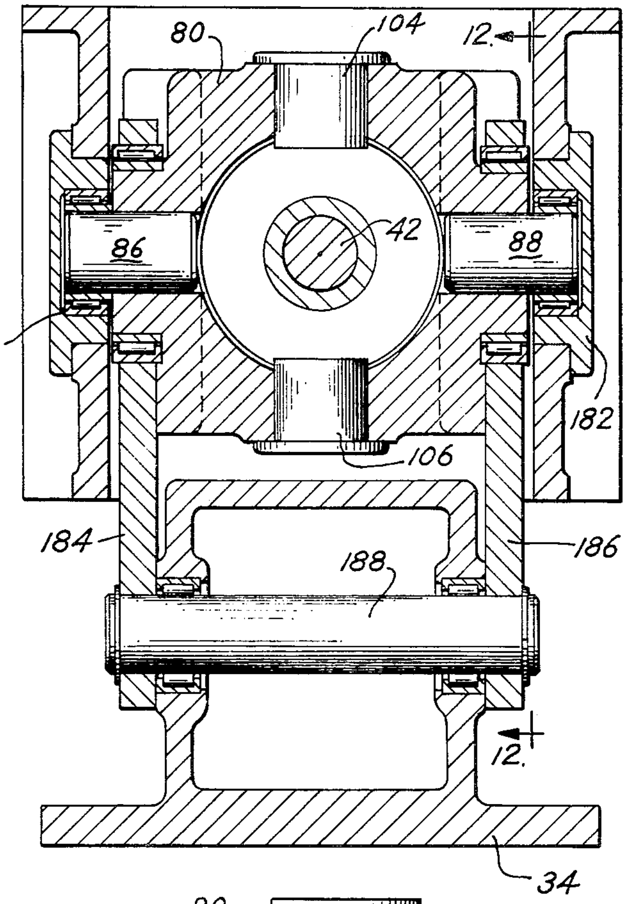
FIG. 11 is a vertical cross sectional view of the press similar to that shown in FIG. 3, illustrating a modified form of the present invention.
Figure 13:
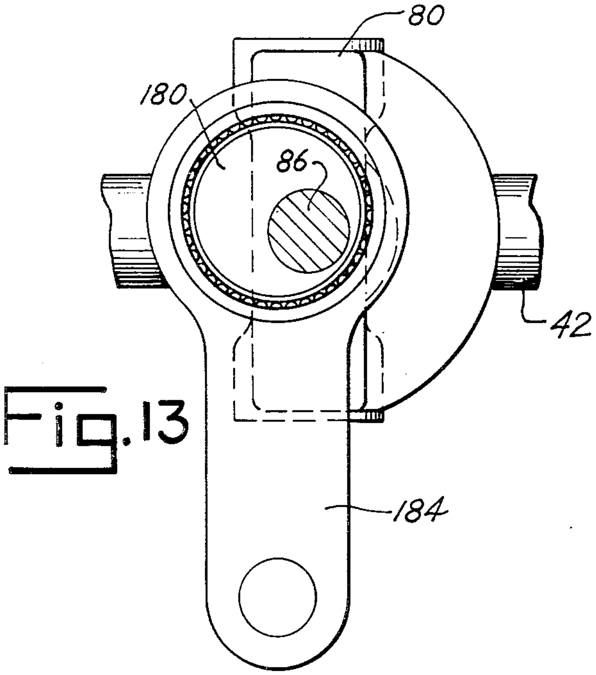
Figure 16:
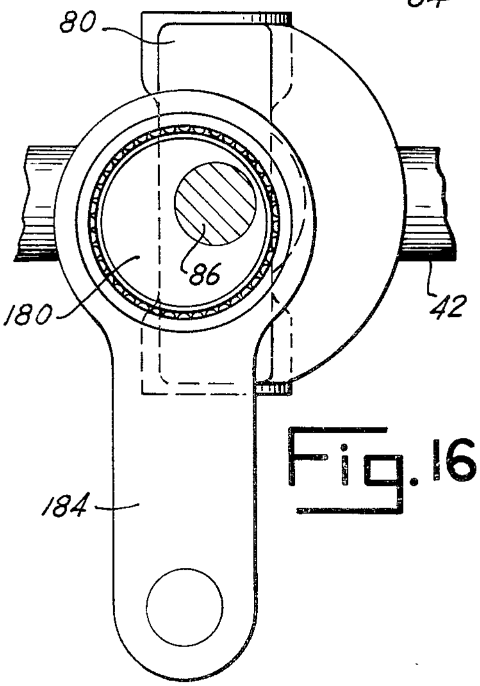

The press embodiments of the invention disclosed in FIGS. 12 through 18 are so constructed and designed that a single stroke for each revolution of the drive shaft is obtained. Cams 180 and 182 are provided on either side of the yoke, and arms 184 and 186 are journaled at their upper ends on the two cams and connected to the ends of shaft 188. As the yoke is oscillated, the cams which are offset in the manner illustrated in FIGS. 12 through 18, cause a variation in the speed of the stroke action. FIG. 12 illustrated the standard stroke action with the cam being equally disposed on the upper and lower sides of the center line of stub shafts 86 and 88. When the cam is adjusted to the position illustrated in FIG. 13, a slower upper portion of the stroke and a faster lower portion of the stroke are obtained. When the cam is adjusted to the position illustrated in FIG. 16, a fast upper portion of the stroke and a slower lower portion of the stroke are obtained. This operation is more effectively illustrated by FIGS. 14, 15 and 17, 18 with respect to the embodiments shown in FIGS. 13 and 16, respectively. The fast lower or work portion of the stroke is desirable for certain blanking operations where speed is important, and the slower upper portion is desirable to permit longer feed lengths and lower feed index operations to be performed. This type of operation is obtained by the cam setting shown in the modifications of FIGS. 13, 14 and 15. A slower lower portion may be desirable for drawing or coining operations. This type of operation is obtained by the cam setting as shown in FIGS. 16, 17 and 18.

The present press, either with or without the modifications of FIGS. 12 through 20, is normally driven automatically, and may be used effectively to perform a variety of different stamping operations using substantially different types of dies. Further, the present drive mechanism, including the wobbble plate, can be utilized in various types of presses, including the heavy stamping operations performed at a slow operating speed or in small presses operated at a rapid rate.

While only one embodiment of the present stamping press has been described in detail herein, various changes and other modifications may be made without departing from the scope of the invention.

I claim:

1. A stamping press comprising a frame, a ram supported by said frame for reciprocable movement, a main shaft for driving said ram, a yoke disposed around said shaft, pivot means being connected to said yoke and having an axis which intersects said main shaft, means connecting said yoke to said ram, a circular wobble plate mounted on said shaft at an angle less than ninety degrees with respect to the axis of said shaft and rotating with said shaft and within said yoke for rocking said yoke and thereby reciprocating said ram to perform repetitive stamping operations.

2. A stamping press as defined in claim 1 in which bearing means interconnects said yoke and wobble plate.

3. A stamping press as defined in claim 2 in which said bearing means is disposed on said yoke on an extension of substantially the center axis of said reciprocating ram.

4. A stamping press as defined in claim 1 in which a pair of bearings interconnects said yoke and wobble plate and said bearings are disposed in diametrically opposed position with respect to said wobble plate.

5. A stamping press as defined in claim 4 in which said bearings are disposed on said yoke on an extension of substantially the center axis of said reciprocating ram.

6. A stamping press as defined in claim 1 in which a counter-weight is disposed in said frame on the side of said drive shaft opposite said ram, and means connects said yoke to said counter-weight for reciprocating said counter-weight in unison but in the opposite direction with respect to said ram.

7. A stamping press as defined in claim 5 in which a counter-weight is disposed in said frame on the side of said drive shaft opposite said ram, and means connects said yoke to said counter-weight for reciprocating said counter-weight in unison but in the opposite direction with respect to said ram.

8. A stamping press as defined in claim 1 in which two bearings interconnect said yoke and wobble plate and are disposed in diametrically opposite position with respect to said wobble plate and at substantially 90° with respect to the pivot means for said yoke.

9. A stamping press as defined in claim 8 in which said bearing are disposed on said yoke on an extension of substantially the center axis of said reciprocating ram.

10. A stamping press as defined in claim 1 in which said means connecting said yoke to said ram consists of a plurality of arms pivoted to the yoke and said ram.

11. A stamping press as defined in claim 6 in which said means for connecting said yoke to said ram consists of a plurality of arms pivoted to said yoke and ram, and a means connecting said yoke to said counter-weight consists of a plurality of arms pivoted to said yoke and said counter-weight.

12. A stamping press as defined in claim 1 in which a cam is disposed around the pivot means for said yoke, and a cam follower and an arm pivotally connect each of said cams with said ram.

13. A stamping press as defined in claim 1 in which means is provided for varying the angularity of said wobble plate with respect to the axis of said shaft and thereby varying the stroke of the press.

14. A stamping press as defined in claim 13 in which said means varying the angularity of the wobble plate consists of a first rack and a pinion, and a second rack moveable axially with respect to said main shaft for rotating said pinion to operate said first rack and thereby change the angularity of said wobble plate.

15. A stamping press as defined in claim 1 in which two wobble plates are mounted on said main shaft, a yoke is provided for each of said wobble plates, and means connect said yokes to said ram.

16. In a stamping press having a ram: a main shaft for driving said ram, a wobble plate mounted on said shaft and rotating therewith, a yoke in which said wobble plate rotates, a pivot means having an axis which intersects said main shaft and being connected to said yoke for producing a rocking motion therewith as said wobble plate rotates therein, a force transmitting member driven by said yoke, and means connecting said force transmitting member to said ram for reciprocating said ram.

17. A stamping press as defined in claim 16 in which a counter-weight is disposed on the side of said drive shaft opposite said ram, and means operatively connects said wobble plate with said counter-weight for reciprocating said counter-weight in unison but in the opposite direction with respect to said ram.

18. A stamping press as defined in claim 16 in which means is provided for varying the angularity of said wobble plate with respect to the axis of said shaft and thereby varying the stroke of the press.

* * * * *